United States Patent
Jain et al.

(10) Patent No.: US 11,188,228 B1
(45) Date of Patent: Nov. 30, 2021

(54) GRAPHING TRANSACTION OPERATIONS FOR TRANSACTION COMPLIANCE ANALYSIS

(71) Applicant: Amazon Technologies, Inc., Seattle, WA (US)

(72) Inventors: Rishabh Jain, Seattle, WA (US); Akshat Vig, Seattle, WA (US); Somasundaram Perianayagam, Seattle, WA (US); Alexander Richard Keyes, Seattle, WA (US); Vaibhav Jain, Seattle, WA (US); James Christopher Sorenson, III, Seattle, WA (US); Amit Gupta, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 16/364,036

(22) Filed: Mar. 25, 2019

(51) Int. Cl.
*G06F 3/06* (2006.01)
*G06F 16/901* (2019.01)

(52) U.S. Cl.
CPC .......... *G06F 3/0604* (2013.01); *G06F 3/0653* (2013.01); *G06F 3/0673* (2013.01); *G06F 16/9024* (2019.01)

(58) Field of Classification Search
CPC ............... G06F 3/00; G06F 3/06–0689; G06F 5/00–16; G06F 9/00–548; G06F 11/00–3696; G06F 12/00–16; G06F 13/00–4295; G06F 17/00–489; G06F 2003/0691–0698; G06F 2009/3883; G06F 2009/45562–45595; G06F 2206/00–20; G06F 2211/00–902; G06F 2212/00–7211; G06F 2213/00–4004; G06F 2216/00–17; G06F 2221/00–2153; G11C 15/00–06; G11C 16/00–3495
See application file for complete search history.

(56) References Cited

U.S. PATENT DOCUMENTS

| | | | | |
|---|---|---|---|---|
| 5,280,612 A | * | 1/1994 | Lorie | G06F 16/2343 |
| 5,740,355 A | * | 4/1998 | Watanabe | H04L 43/045 |
| | | | | 714/39 |
| 5,960,436 A | * | 9/1999 | Chang | G06F 9/466 |
| 6,199,070 B1 | * | 3/2001 | Polo-Wood | G06F 16/00 |
| 6,804,672 B1 | * | 10/2004 | Klein | G06F 16/23 |

(Continued)

OTHER PUBLICATIONS

Amazon's Dynamo; Werner Vogels; Oct. 2, 2007; retrieved from https://www.allthingsdistributed.com/2007/10/amazons_dynamo.html on Mar. 11, 2021 (Year: 2007).*

(Continued)

*Primary Examiner* — Daniel C. Chappell
(74) *Attorney, Agent, or Firm* — Robert C. Kowert; Kowert, Hood, Munyon, Rankin & Goetzel, P.C.

(57) ABSTRACT

Transaction operations may be graphed in order to determine performance compliance of transactions. An event to analyze transactions may be detected. Transactions to analyze for the event may be identified and a description of transaction operations for the identified transactions may be obtained. A graph of the transaction operations may be generated to indicate the dependencies between transactions and an evaluation of the graph may be performed to determine whether the transactions were performed with serializable isolation.

20 Claims, 12 Drawing Sheets

(56) References Cited

U.S. PATENT DOCUMENTS

| | | | | |
|---|---|---|---|---|
| 8,122,050 | B2* | 2/2012 | Mordvinov | G06F 16/245 707/769 |
| 8,141,054 | B2 | 3/2012 | Dolby et al. | |
| 8,209,567 | B2* | 6/2012 | Cohen | G06F 16/285 714/45 |
| 8,260,840 | B1* | 9/2012 | Sirota | G06F 9/5061 709/201 |
| 8,326,794 | B1* | 12/2012 | Wood | H04L 43/0817 707/600 |
| 8,612,390 | B2* | 12/2013 | Wang | G06F 16/24539 707/640 |
| 8,903,803 | B1* | 12/2014 | Aly | G06F 16/2264 707/713 |
| 8,977,898 | B1* | 3/2015 | Veeraswamy | G06F 16/1865 714/20 |
| 9,058,416 | B2* | 6/2015 | Angeles | H04L 29/06 |
| 10,331,657 | B1* | 6/2019 | Cole | G06F 16/901 |
| 10,467,147 | B1* | 11/2019 | Ahmed | H04L 67/2842 |
| 10,489,225 | B2* | 11/2019 | Bangad | G06F 9/5011 |
| 10,747,609 | B1* | 8/2020 | Griffin | H04L 9/3239 |
| 11,030,308 | B2* | 6/2021 | Li | G06F 9/4881 |
| 2014/0096221 | A1* | 4/2014 | Wallis | H04L 63/0807 726/9 |
| 2014/0183269 | A1* | 7/2014 | Glaser | G06F 3/0346 235/492 |
| 2014/0351639 | A1* | 11/2014 | Vandikas | G06F 11/1438 714/20 |
| 2015/0355907 | A1* | 12/2015 | Gschwind | G06F 9/3004 712/216 |
| 2017/0351585 | A1* | 12/2017 | Bourbonnais | G06F 16/27 |
| 2018/0144015 | A1* | 5/2018 | Mittur Venkataramanappa | G06F 11/1471 |
| 2019/0349426 | A1* | 11/2019 | Smith | H04W 84/22 |

OTHER PUBLICATIONS

Database Management Systems, Third Edition; Ramakrishnan et al.; ISBN 0-07-246563-8; International Edition, 2003; pp. 550-552 (Year: 2003).*

L. Cui, Z. Shang and Y. Shi, "A Transaction Management Model Based on Compensation Planning Graph for Web Services Composition," 2011 IEEE International Conference on Web Services, 2011, pp. 275-282. (Year: 2011).*

Chang Yao, Meihui Zhang, Qian Lin, Beng Chin Ooi, and Jiatao Xu. 2018. Scaling distributed transaction processing and recovery based on dependency logging. The VLDB Journal 27, 3 (Jun. 2018), 347-368. (Year: 2018).*

Rachel Harding, et al., "An Evaluation of Distributed Concurrency Control", Proceeding of the VLDB Endowment, vol. 10, No. 5, 2017, pp. 553-564.

U.S. Appl. No. 16/014,890, filed Jun. 21, 2018, Douglas Brian Terry et al.

* cited by examiner

GRAPHING TRANSACTION OPERATIONS FOR TRANSACTION COMPLIANCE ANALYSIS

BACKGROUND

Different database systems offer different features for performing operations with respect to data in the database system. In some scenarios, some features may provide some functionality at the cost of other capabilities or performance. For example, transactions offered as a feature of a database may provide facilitate the construction of correct and reliable applications that wish to maintain multi-item invariants. Thus, highly performant techniques for implementing and enforcing a reliable transaction feature may be desirable.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement graphing transaction operations for transaction compliance analysis, according to some embodiments. Distributed data sets can offer many performance advantages to users, in various embodiments. By distributing the data and work to access the data amongst multiple storage locations, a scalable, available, and highly performant storage solutions can be implemented, in some embodiments. To support transactions in addition to requests for individual items, distributed database systems may order the performance of requests, including transaction operations in order to ensure that Atomicity Consistency Isolation and Durability (ACID) principles are satisfied in order to ensure that transactions are perceived as a single logical operation across data set(s), in various embodiments. Performing transactions across distributed data sets in scenarios where the individual storage locations themselves cannot verify ACID principles could introduce some uncertainty as to whether the expected behavior of transactions satisfied ACID principles in fact. Graphing transaction operations for transaction compliance analysis may provide a scalable and efficient technique for data storage systems to verify transaction performance compliance for some ACID features, like atomicity and isolation, so as to quickly detect and deploy corrections to data or to the execution of components (e.g., by code updates, software patches, configuration changes, etc.). In this way, the performance of systems that perform transactions across distributed data sets is improved by ensuring that the transactions comply with ACID features, without introducing further complications or delay into the path of performing of transactions (as graphing analysis can be used to detect and correct problems for future transaction performance).

Figure 1:
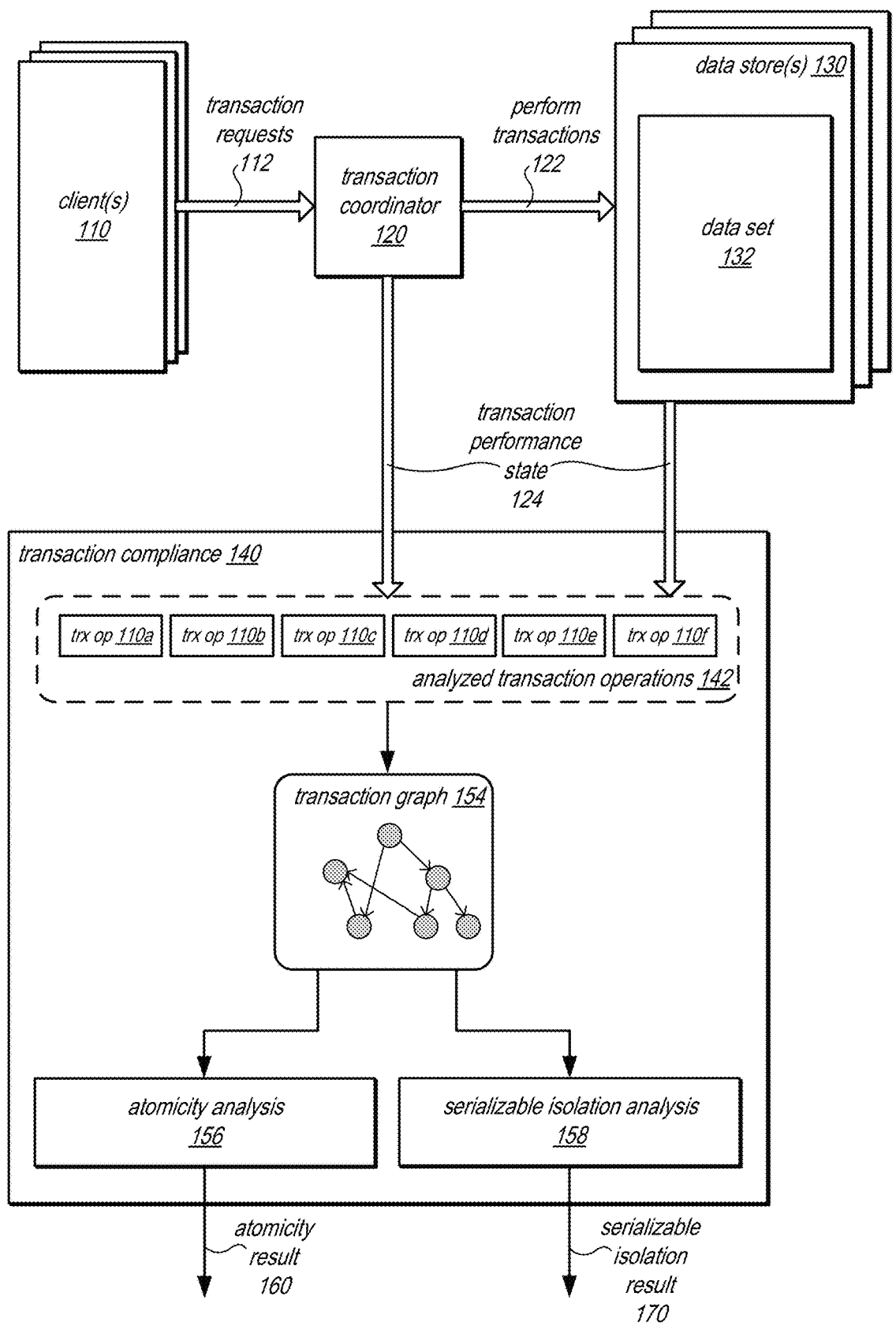
FIG. 1 is a logical block diagram illustrating graphing transaction operations for transaction compliance analysis, according to some embodiments.

FIG. 1 is a logical block diagram illustrating graphing transaction operations for transaction compliance analysis, according to some embodiments. Client(s) 110 may submit transaction requests 112 that are directed to a data set 132, which may be stored across one or more data stores 130. Data store(s) 130 may implement a database (e.g., a partition of a database table) across one or multiple locations, such as at different storage nodes, in some embodiments. Data store(s) 130 may be any of various types of database systems, including relational and non-relational database systems, or other storage systems, such as key-value stores, file systems, data processing systems, and so on, that may support transaction requests, in some embodiments. In order to ensure that a transaction request performed across data set 132 at data store(s) 132 in a way that is fully compliant with ACID principles, a transaction coordinator may be implemented, such as transaction coordinator 120. Transaction requests 112 may be submitted, routed, or dispatched to transaction coordinator 120 which may interact with data store(s) 130 to perform the requested transactions.

Transaction coordinator 120 and data store(s) 130 may record transaction performance state 124, which may describe, among other information, the transaction operations performed, such as transaction operations 110a, 110b, 110c, 110d, 110e, 110f, which may be operations to modify, change, update, or otherwise write to items in data set 132. As discussed in detail below with regard to FIGS. 7-10, a transaction graph 154 may be generated that indicates the dependencies between transactions, which can be used to organize data for evaluation and evaluate whether transactions comply with certain features. For example, atomicity analysis 156 may be implemented to determine whether all writes in a transaction are performed or none of them are, according to techniques such as those discussed below with regard to FIG. 11. Serializable isolation analysis 158 may be implemented to determine whether writes from different transactions are not interleaved in their execution, so that a transaction is serialized with respect to other transactions and non-transactional operations on the same data items, in some embodiments. The atomicity results 160 and serializable isolation result 170 may be provided to a monitoring feature, client interface, or other analysis tool, in some embodiments.

Please note that previous descriptions of implementing graphing transaction operations for transaction compliance analysis are not intended to be limiting, but are merely provided as logical examples.

This specification begins with a general description of a provider network that may implement services that may implement graphing transaction operations for transaction compliance analysis. Then various examples of a database service are discussed, including different components/modules, or arrangements of components/module, that may be employed as part of implementing the database service, in one embodiment. A number of different methods and techniques to implement graphing transaction operations for transaction compliance analysis are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
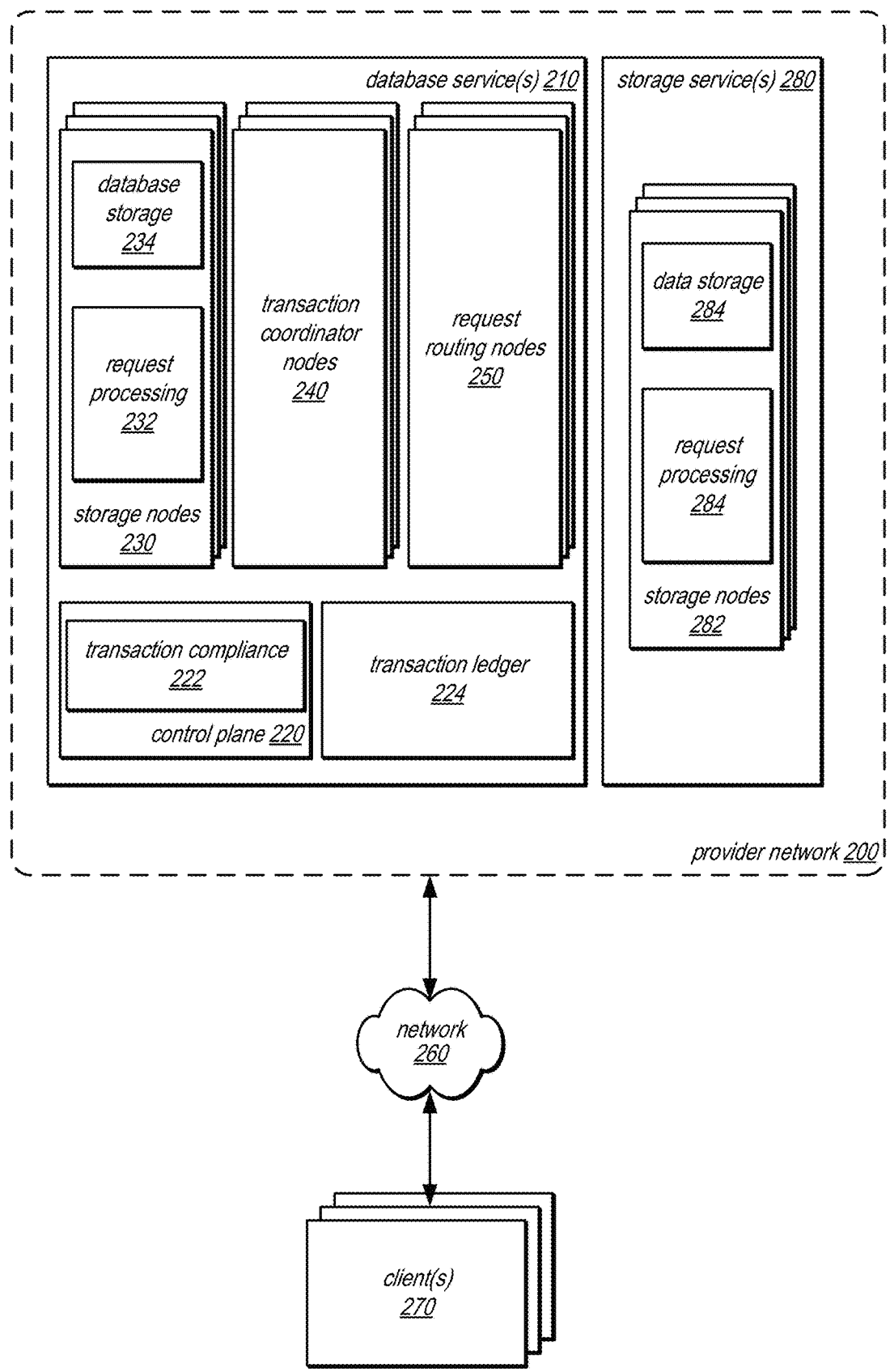
FIG. 2 is a logical block diagram illustrating a provider network that implements services that may implement graphing transaction operations for transaction compliance analysis, according to some embodiments.

FIG. 2 is a logical block diagram illustrating a provider network that implements services that may implement graphing transaction operations for transaction compliance analysis, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 250, in another embodiment. In one embodiment, provider network 200 may be implemented in a single location or may include numerous data centers hosting various resource pools, such as collections of physical and/or virtualized computer servers, storage devices, networking equipment and the like (e.g., computing system 2000 described below with regard to FIG. 12), needed to implement and distribute the infrastructure and storage services offered by the provider network 200. In one embodiment, provider network 200 may implement various computing resources or services, such as database service(s) 210 (e.g., relational or non-relational (NoSQL) database query engines), and other services (not illustrated), such as a map reduce service, data warehouse service, data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 12 and described below. In one embodiment, the functionality of a given system or service component (e.g., a component of database service(s) 210) may be implemented by a particular node or may be distributed across several nodes. In some embodiments, a given node may implement the functionality of more than one service system component (e.g., more than one data store component).

Database service(s) 210 may include various types of database services, in one embodiment, (both relational and non-relational) for storing, querying, and updating data. Such services may be enterprise-class database systems that are highly scalable and extensible. In one embodiment, queries may be directed to a database in database service(s) 210 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service(s) 210 may provide a RESTful programmatic interface in order to submit access requests (e.g., to get, insert, delete, or query data). In one embodiment, database service(s) 210 may also be any of various types of data processing services that implement or allow transactions.

In one embodiment, clients 250 may encompass any type of client configurable to submit network-based requests to provider network 200 via network 260, including requests for database service(s) 210 (e.g., to perform a transaction to a database hosted in database service 210). For example, in one embodiment a given client 250 may include a suitable version of a web browser, or may include a plug-in module or other type of code module that executes as an extension to or within an execution environment provided by a web browser. Alternatively in a different embodiment, a client 250 may encompass an application such as a database client/application (or user interface thereof), a media application, an office application or any other application that may make use of a database in database service(s) 210 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that interacts directly with provider network 200, in one embodiment. In one embodiment, client 250 may generate network-based services requests according to a Representational State Transfer (REST)-style network-based services architecture, a document- or message-based network-based services architecture, or another suitable network-based services architecture. Note that in some embodiments, clients of database service(s) 210 may be implemented within provider network 200 (e.g., applications hosted on a virtual compute service).

In one embodiment, a client 250 may provide access to provider network 200 to other applications in a manner that is transparent to those applications. For example, client 250 may integrate with a database on database service(s) 210. In such an embodiment, applications may not need to be modified to make use of the storage system service model. Instead, the details of interfacing to the database service(s) 210 may be coordinated by client 250.

Client(s) 250 may convey network-based services requests to and receive responses from provider network 200 via network 260, in one embodiment. In one embodiment, network 260 may encompass any suitable combination of networking hardware and protocols necessary to establish network-based-based communications between clients 250 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 250 and the Internet as well as between the Internet and provider network 200. It is noted that in one embodiment, client(s) 250 may communicate with provider network 200 using a private network rather than the public Internet.

Figure 3A:
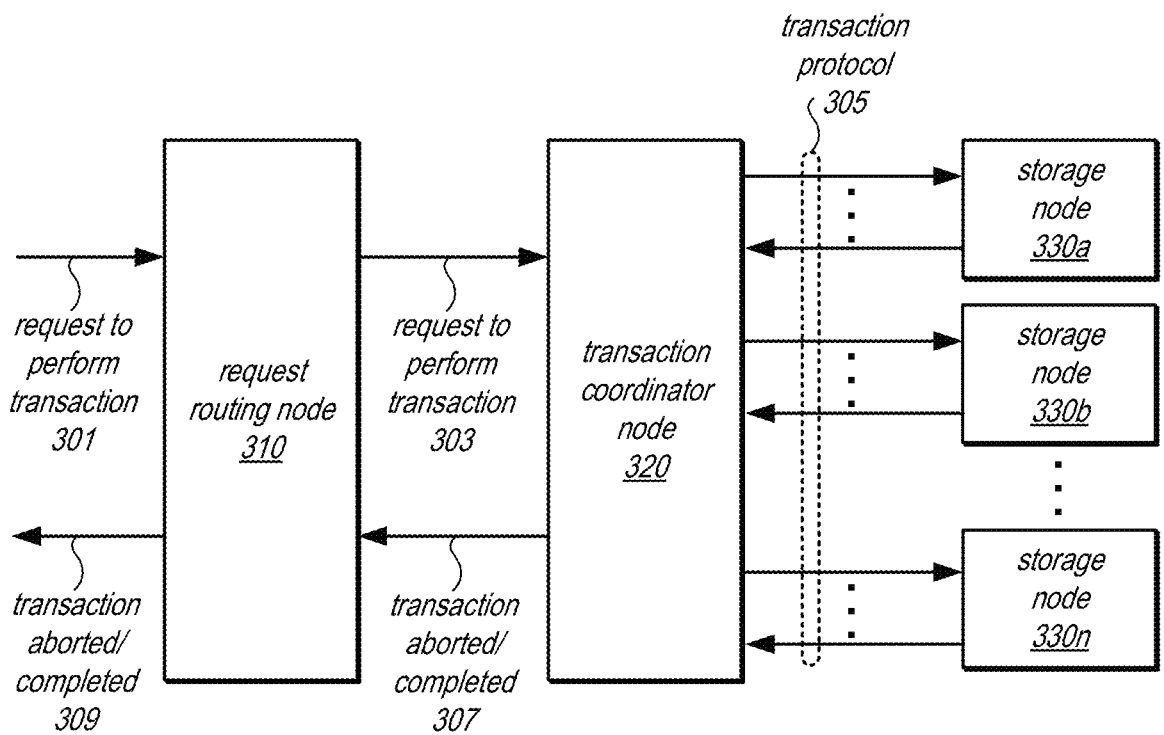
FIGS. 3A and 3B are logical block diagrams illustrating different routing paths for transactions and non-transaction requests, according to some embodiments.
Figure 3B:
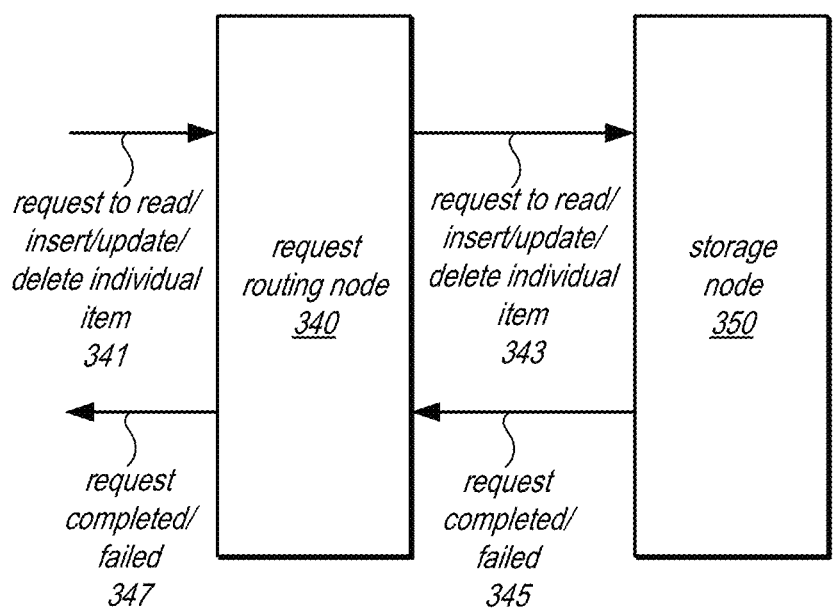

Database service 210 may implement request routing nodes 250, in one embodiment. Request routing nodes 250 may receive, authenticate, parse, throttle and/or dispatch service or other access requests, among other things, in one embodiment. For example, FIGS. 3A and 3B illustrate different routing paths for transactions and non-transaction requests, according to some embodiments. As discussed below with regard to FIGS. 3A and 4, a transaction coordinator node, such as one of transaction coordinator nodes 240, may be included in the path for a request to perform a transaction, in some embodiments, while a non-transaction request may be sent directly to an appropriate storage node.

In one embodiment, request routing nodes 250 may support handling requests formatted according to an interface to support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables). In one embodiment, database service 210 may support different types of services requests. For example, in one embodiments, database service 210 may implement a particular web services application programming interface (API) that supports a variety of operations on tables (or other data objects) that are maintained and managed on behalf of clients/users by the data storage service system (and/or data stored in those tables), such as a request to perform a transaction that includes operations (e.g., requests to read, write, update, delete, add, or insert items in a table) with respect to one or multiple items across one or multiple partitions of a table hosted at one or multiple storage nodes (which may be storage nodes 230 and/or storage nodes in another system or service, like storage nodes 282). Similarly, a request may be a request to perform operations on individual items (e.g., requests to read, write, update, delete, add, or insert items in a table, according to a specified consistency level or characteristic). In one embodiment, request routing nodes 250 may perform parsing and/or throttling of service requests, authentication and/or metering of service requests, dispatching service requests, and/or maintaining partition assignments that map storage nodes to partitions of tables hosted in database service(s) 210.

In one embodiment, database service 210 may implement control plane 220 to implement one or more administrative components, such as automated admin instances which may provide a variety of visibility and/or control functions). Control plane 220 may provide visibility and control to system administrators, detect split events for partitions of tables at storage nodes, and/or anomaly control, resource allocation, in one embodiment. In one embodiment, control plane 220 may also include an admin console, through which system administrators may interact with database service 210 (and/or the underlying system). In one embodiment, the admin console may be the primary point of visibility and control for database service 210 (e.g., for configuration or reconfiguration of tables by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as split requests to be processed, at database service 210, in one embodiment.

Control plane 320 may direct the performance of different types of control plane operations among the nodes, systems, or devices implementing database service 210, in one embodiment. For instance, control plane 220 may communicate with processing nodes to initiate the performance of various control plane operations, such as moves, splits, update tables, delete tables, create indexes, etc. . . . . . In some embodiments, control plane 220 may implement transaction compliance, as discussed in detail below with regard to FIGS. 6 and 7, which may support transaction compliance for transactions performed across one or more storage nodes in database service(s) 210 (and possibly other storage service(s) 280).

In one embodiment, database service 210 may also implement a plurality of storage nodes 230, each of which may manage one or more partitions of a database table on behalf of clients/users or on behalf of database service 210 which may be stored in database storage 234 (on storage devices attached to storage nodes 230 or in network storage accessible to storage nodes 230).

Storage nodes 230 may implement request processing 232, in one embodiment. Request processing 232 may create, update, define, query, and/or otherwise administer databases, in one embodiment. For instance, request processing 232 may maintain a database according to a database model (e.g., a relational or non-relational database model). In one embodiment, request processing 232 may allow a client to manage data definitions (e.g., Data Definition Language (DDL) requests to describe column definitions, requests to add item attributes, etc.). In one embodiment, request processing 232 may handle requests to access the data (e.g., to perform transactions, to insert, modify, add, or delete data, and requests to query for data by generating query execution plans to determine which partitions of a database may need to be evaluated or searched in order to service the query). In one embodiment, request processing 232 may also perform other management functions, such as enforcing access controls or permissions, concurrency control, or recovery operations.

In one embodiment, database service 210 may provide functionality for creating, accessing, and/or managing tables at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 2. Note also that in one embodiment, one or more storage nodes 230 process access requests on behalf of clients directed to tables. Some of these processing nodes may operate as if they were in a multi-tenant environment, and others may operate as if they were in a single-tenant environment. In some embodiments, storage nodes 230 that operate as in a multi-tenant environment may be implemented on different processing nodes (or on different virtual machines executing on a single host) than processing nodes that operate as in a single-tenant environment.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of a particular portion of data (e.g., a partition of a table) for the database service 210. Moreover, different replica groups may utilize overlapping nodes, where a storage node 230 may be a member of multiple replica groups, maintaining replicas for each of those groups whose other storage node 230 members differ from the other replica groups.

Different models, schemas or formats for storing data for database tables in database service 210 may be implemented, in some embodiments. For example, in some embodiments, a relational data model that stores database tables structured as rows with fields for a defined number of columns may be implemented. In some embodiments, non-relational (e.g., NoSQL), key-value, or semi structured data may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more key (or key)-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no pre-defined schema other than their reliance on the primary key, in some embodiments. As discussed below with regard to FIG. 5, in some embodiments, items in a table may include attributes that are either system data or application data.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes (e.g., by modifying the amount of throughput capacity, adding storage capacity for additional read replicas, splitting partitions or moving partitions), and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as transactions, storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

In addition to database services 210, provider network 200 may also implement storage service(s) 280, which may store data differently (e.g., in different formats or supporting different features or styles of storage, such as key value stores, file systems, or other types of storage systems). Storage service(s) 280 may also implement storage nodes 282, which may provide data storage 284 for data sets that may be included in a transaction performed by transaction coordinator nodes according to the techniques discussed below. Request processing 284 may support both the operations requested by a user in performing a transaction as well as the features of the protocol administered by the transaction coordinator nodes 240, though other features different than those supported by database services 210 for instance may also be supported by request processing 284.

FIG. 3A illustrates a routing path for requests to perform transactions. A request routing node 310 may receive a request 301 to perform a transaction (e.g., a TransactItems request). In some embodiments, the request 301 may include one or more operations to perform as part of the transaction (e.g., read/get, write/update, insert/add, delete/remove operations). In at least some embodiments, the request 301 may include preconditions to be met in order for the transaction to commit. For instance, a precondition may check that an attribute exists or that it has a specific value or that its value begins with a particular string. Preconditions may involve any items in any tables and are not limited to the items being updated in the transaction (e.g., a transaction is performed upon table A but a precondition can be specified and evaluated with respect to table B). As an example, suppose that an application wishes to transfer $50 from Bob's bank account to Mary's account. This application may first read both Bob's and Mary's account balances, compute the adjusted amounts, and then submit a transaction that writes new balances with the condition that the balances did not change between when they were read and when the transaction was processed.

Request routing node 310 may dispatch or send the request 303 to perform the transaction 303 to a selected transaction coordination node 320 (e.g., according to various load balancing or other request distribution techniques), in some embodiments. Transaction coordinator node 320 may perform a transaction protocol 305, discussed in detail below with regard to FIG. 4, in some embodiments. Request may be sent to one or multiple storage nodes, such as storage nodes 330a, 330b, and 330n (which may be storage nodes in database services 210 and/or other data stores, such as storage nodes for storage service(s) 280). Storage nodes 330 may order the transaction (or reject/abort/fail it) according to a timestamp value or other sequence value assigned to it by transaction coordinator node 320, along with other transactions received from transaction coordinator 320 and/or directly from request routing node 310 (or other request routing node). Transaction coordinator node 320 may return an indication as to whether the transaction aborted or completed successfully to request routing node 310, which in turn may return an indication as to whether the transaction aborted or completed 309 (e.g., to a requesting client).

FIG. 3B illustrates a routing path for requests to perform non-transactions, according to some embodiments. As indicated at 341, a request routing node 340 may receive a request to read, inset, update, or delete an individual item in a database table, in some embodiments. Instead of routing the request to a transaction coordinator, like transaction coordinator 320 in FIG. 3A, request routing node 340 may direct the request 343 directly to a storage node that stores the item (e.g., in the appropriate partition of a database table), in some embodiments. For example, request routing node 340 may maintain a listing or other information describing a partitioning scheme for a table (e.g., a primary key value and hash function to determine a hash value that may be mapped to one partition of the table. Storage node 350 may determine whether to complete or fail the request to read, insert, update, or delete the individual item, independently from other storage nodes or a transaction coordinator perform a transaction that includes an operation to be performed at storage node 350. As indicated at 345 and 347, an indication that the request completed or failed may be provided to request routing node 340, which may in turn provide the request completion/failure notification to a client.

Figure 4:
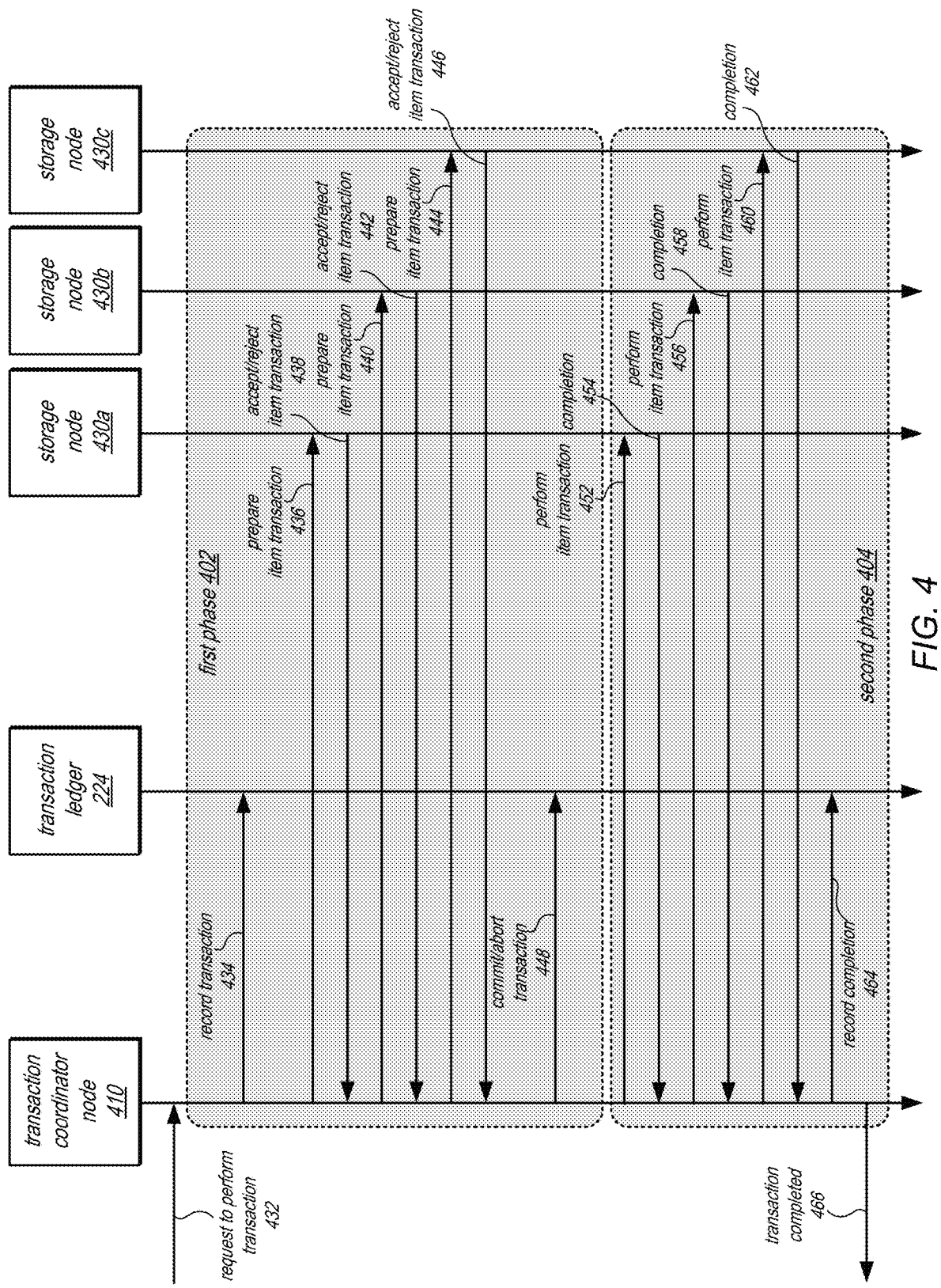
FIG. 4 is a sequence diagram illustrating a transaction protocol, according to some embodiments.
Figure 5:
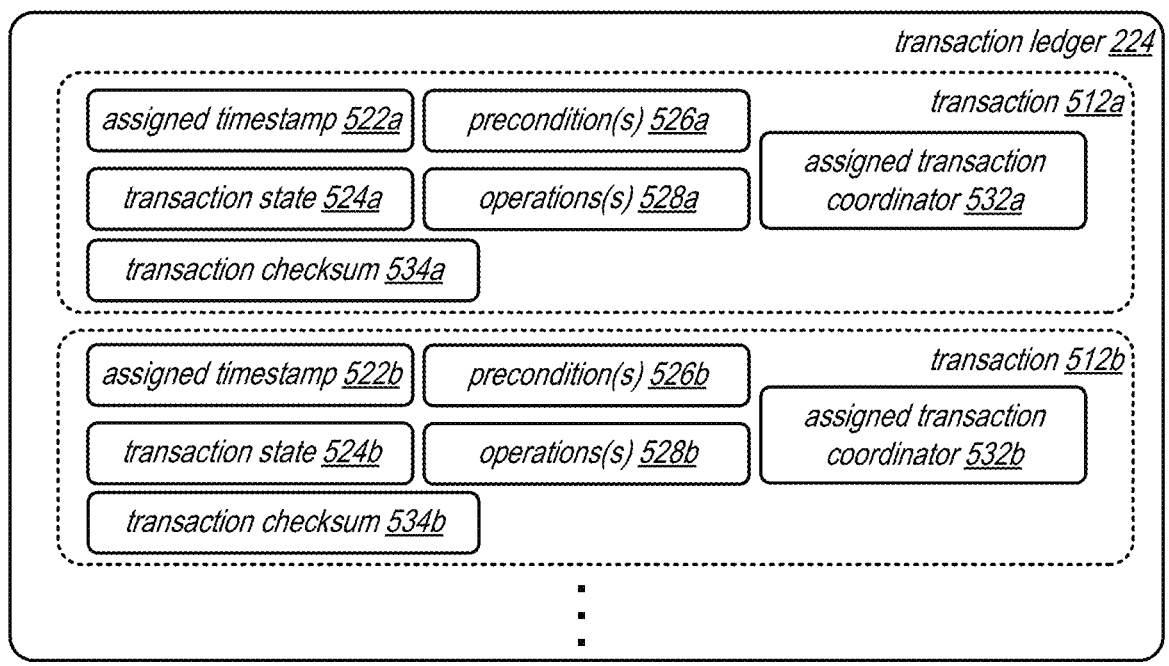
FIG. 5 is an example transaction ledger for performing a transaction protocol, according to some embodiments.

FIG. 4 is a sequence diagram illustrating a transaction protocol, according to some embodiments. In at least some embodiments, a two-phase protocol may be implemented for a transaction coordinator to determine whether a transaction can be committed to a distributed database. A request to perform a transaction may be received 432 at transaction coordinator node 410, in some embodiments. Transaction coordinator 410 may record the transaction 434 in transaction ledger 420, in some embodiments. FIG. 5 is an example transaction ledger for performing a transaction protocol, according to some embodiments.

In various embodiments, transaction ledger 420 may be maintained to ensure the survival of transactions beyond the failure of individual transaction coordinators. For example, to ensure that a failure of a transaction coordinator, such as transaction coordinator 410, does not result in a partially executed transaction, which would violate an atomicity guarantee for the transaction that all (or none) of a transaction completes, the transaction coordinator may store various information about the transaction so that the transaction can be resumed by another transaction coordinator in some embodiments. In FIG. 5, transaction ledger 510 (which may be similar to transaction ledger 420 in FIG. 4) may store transactions across database service 210 (or a portion thereof), in some embodiments.

A transaction entry, such as entries 512a and 512b, may include, a timestamp assigned to the transaction by the transaction coordinator 522a and 522b, preconditions (if any) of operations performed in the transaction 526a and 526b, the operations to be performed (e.g., reads, writes, updates, inserts, additions, deletions, etc.) 528a and 528b and an identifier of the assigned transaction coordinator 532a and 532b, in some embodiments. The state of the transaction, transaction state 524a and 524b, may be included and updated, in some embodiments. For example, the possible states of transaction state 524 may include "Started," "Committed," "Completed," or "Aborted." A transaction checksum, such as transaction checksum 534a, and 534b, may be stored for each transaction according to a value generated from a checksum function applied to the items changed, updated, or otherwise written to by a transaction, in some embodiments).

A transaction ledger may be implemented using various storage technologies or systems, in some embodiments. For example, transaction ledger 420 may be implemented as another table in database service 210 or hosted in another type of storage system or service in provider network 200. In at least some embodiments, transaction ledge may be organized as an append-only log. In some embodiments, transaction ledger 420 may support operations for scanning and truncating the log. For example, scanning may be used for transaction recovery. In some embodiments, portions of the ledger that contain already committed or aborted transactions can be discarded using truncation to reclaim space and to reduce the number of records (e.g., when scanned for transaction recovery). In some embodiments, transaction records may be retained for a period of time to support additional features such as monitoring and/or debugging. In some embodiments, transactions on different tables may share the same transaction ledger. In some embodiments, multiple transaction ledgers could be used in parallel. In some embodiments, transactions can be assigned to a ledger using a fixed assignment, e.g. all transactions on tables in a specific customer account use a specific ledger, or can be randomly assigned to a transaction ledger. In at least some embodiments, transaction ledgers may be used to provide a stream of transactions performed in database and/or table that are sent to another system. And in some embodiments, the ledger can be re-constructed from replication logs by downloading logs for the time window for which verification is to be performed.

Turning back to FIG. 4, transaction coordinator may send requests to prepare an individual item within the transaction, such as requests 436, 440, and 444, for the transaction to the storage nodes that store the transaction, such as storage nodes 430a, 430b, and 430c (which may be storage nodes in database services 210 and/or other data stores, such as storage nodes for storage service(s) 280). Storage nodes 430 may also receive a timestamp value assigned to the transaction, as well as further information, for determining whether the storage node 430 can accept the transaction for the item, in some embodiments, based on an evaluation of the timestamp and other information maintained for the item by storage nodes 430a.

In some embodiments, an item stored in a table may include system data for ordering transaction requests according to an independently assigned sequence and application data, according to some embodiments. An item may maintain system data as attributes of the item or in a separate collection of data describing one or multiple items in addition to application data (e.g., application visible data used by an application when interacting with the item), in some embodiments. System data may include various information for ordering, accepting, and/or rejecting transaction requests and non-transaction requests at storage nodes. For example, system data may include a timestamp of a latest committed transaction operation that has written to the item, an identifier of a transaction coordinator that submitted the transaction of the latest committed transaction operation 542 that has written to the item, a timestamp of the latest non-transaction write to the item, a timestamp of the latest read of the item, a timestamp of pending transaction that intends to write to the item, an indication of a successfully checked precondition for the pending transaction, an indication of whether item has been deleted according to a tombstone marker, and a history or set of transactions that have been accepted but not yet performed, in some embodiments.

In some embodiments, storage nodes 430 may send respective determinations 438, 442, and 446 to transaction coordinator node 410, indicating whether the transaction for the item is accepted or rejected by the storage node. If transaction coordinator node 410 does not receive a response, transaction coordinator node 410 may retry a number of times before aborting the transaction. Based on the responses, transaction coordinator 410 may determine whether the transaction can be committed or aborted, in some embodiments. An update to transaction ledger 420 to reflect the decision 448 may be made, in some embodiments. The first phase 402 may be complete. Please note that further interactions as discussed below with regard to FIG. 8 may be performed if the transaction aborts which are not illustrated.

If the transaction is committed, second phase 404 may be performed by transaction coordinator node 410. Transaction coordinator node 410 may send respective requests to perform the item transactions, 452, 456, and 460, to storage nodes 430. Once storage nodes 430 have performed the item transactions (which may be performed according to an ordering or timing determined by storage nodes 430 after receipt of requests 452, 456, and 460, in some embodiments, then storage nodes 430 may return responses indicating completion, such as responses 454, 458, and 462. Transaction coordinator 410 may record 464 the state of the transaction as completed in transaction ledger 420 and send a completion indication 466 for the transaction (e.g., to a client or request routing node to forward to a client).

Figure 6:
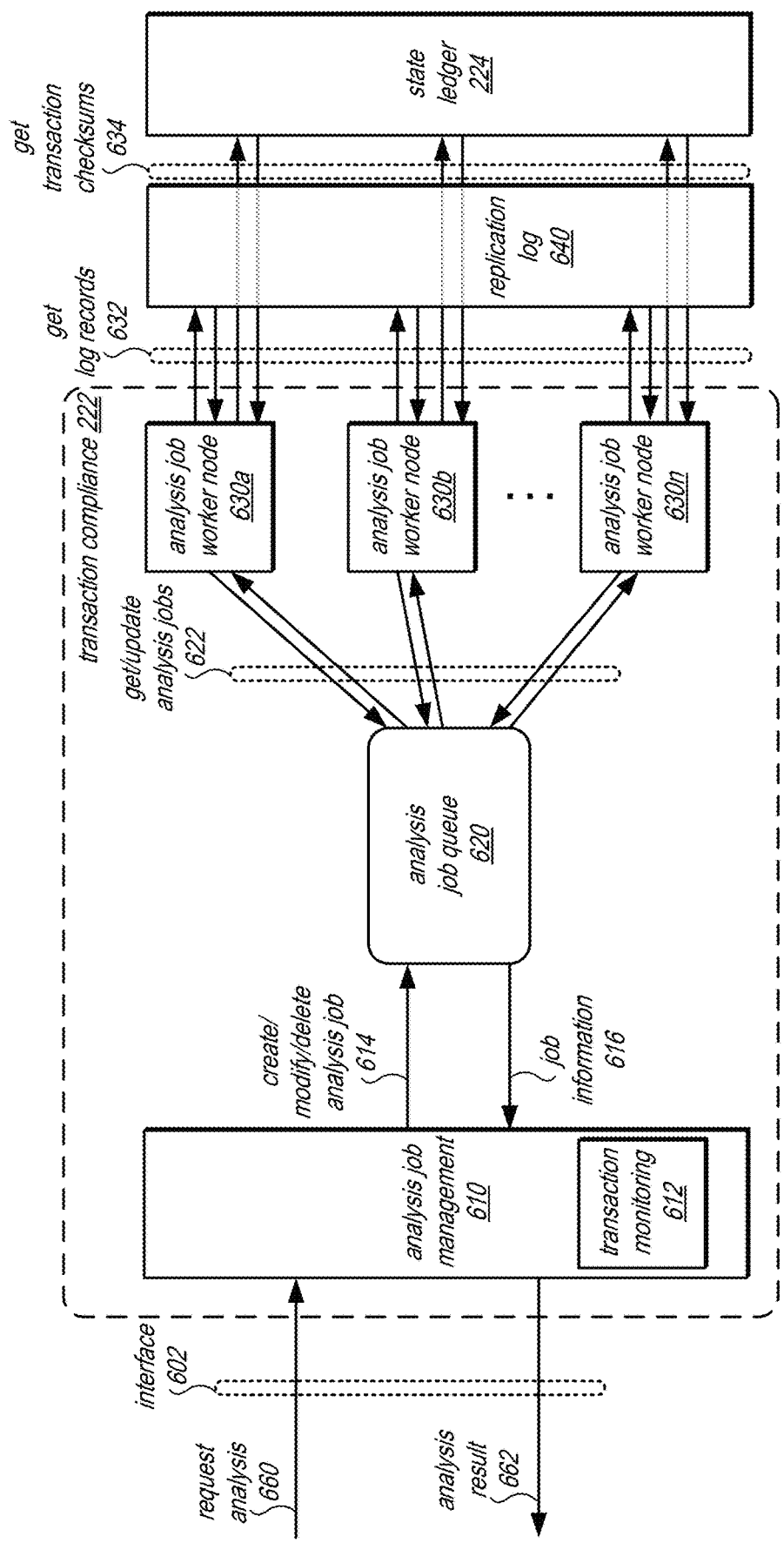
FIG. 6 is a logical block diagram illustrating transaction compliance implemented as part of a control plane for a database service that performs transactions, according to some embodiments.

Performing transactions across multiple different components over a network in distributed fashion, as discussed above, may create opportunities for code errors, hardware failures, network failures, or other problems to introduce failures into the performance of transactions (although the possibility of such failures may exist in non-distributed systems which could also benefit from the compliance detection techniques discussed below). By monitoring for transaction compliance failures or analyzing specified times for transaction compliance failures, a control plane can provide confidence that transactions are performing properly and any errors that occur can be detected. FIG. 6 is a logical block diagram illustrating transaction compliance implemented as part of a control plane for a database service that performs transactions, according to some embodiments.

Interface 602 may be a programmatic interface (e.g., supporting one or more application programming interfaces (APIs)), command line interface, and/or graphical user interface (GUI). A client application (e.g., on behalf of a user like a service administrator or customer) may be submit a request for analysis 660 via interface 602. The analysis request 660 may specify various features for transaction compliance analysis, such as the time period of analysis, the data sets, users, accounts, or other identities of information to examine (or to exclude from examination), a specified type of compliance analysis (e.g., atomicity and/or serializable isolation), a run time to perform the analysis, among other user specified features. In some embodiments, request 660 may configure transaction monitoring for a distributed data set (e.g., the percentage of transactions to analysis or the frequency of compliance analysis). Analysis job management 610 may receive the request via interface 602, and create 614 a corresponding analysis job in analysis job queue 620. Transaction monitoring 612 may be implemented in some embodiments, which may periodically, continuously, or for a percentage of transactions monitor transaction performance analysis (e.g.,). Analysis job management 610 may also create jobs 614 to satisfy transaction monitoring 612 requirements, in some embodiments.

One or multiple analysis job workers nodes, such as analysis job worker nodes 630a, 630b, and 630n, may be implemented to independently perform analysis jobs. In this way, a fleet or pool of analysis job worker nodes 630 can be maintained and changed in size to respond to demand upon transaction compliance 222. Analysis job worker nodes 630 may get update analysis jobs 622 from analysis job queue 620. Analysis job worker nodes 630 may perform the analyses identified in the retrieved jobs. For example, analysis job workers 630 may retrieve the log records 632 from replication log 640 to construct the graph, as discussed below. Replication log 640 may be accessed from storage nodes, like storage nodes 230 or storage nodes 282, that store parts of the data set, or from storage nodes that store the replication log separately (e.g., a replication log archive). Analysis job worker nodes 630 may get transaction checksums 634 from state ledger 224.

Although not illustrated, in some embodiments, archive components may store or move portions of replication log 640 or state ledger 224 to other data stores. Retrieval and reconstruction operations may be performed as part of an analysis job, either by analysis job worker nodes 630 or by a separate component (e.g., reconstructing the state ledger records beyond retention time threshold like 12 hours).

Figure 7:
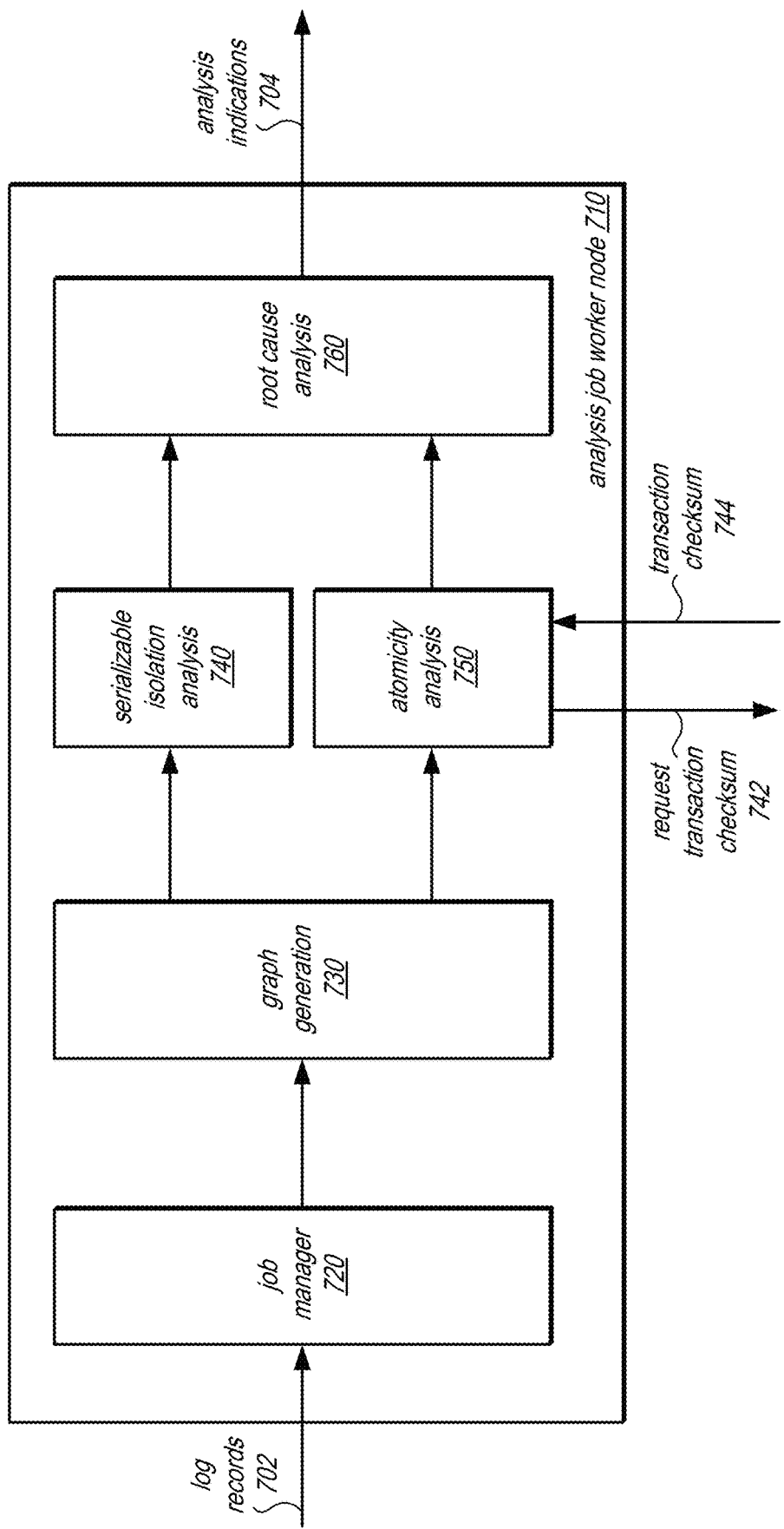
FIG. 7 is a logical block diagram illustrating an analysis job worker, according to some embodiments.

As discussed above, analysis jobs may be distributed amongst different nodes in order to allow for analysis tasks to scale to meet the demand (e.g., demand from ad hoc requests from users via an interface and/or the demand of continuously or periodically running transaction processing and compliance monitoring feature). FIG. 7 is a logical block diagram illustrating an analysis job worker, according to some embodiments. Analysis job worker node 710, like analysis job worker nodes 630 in FIG. 6 discussed above, may be implemented on one or more computing systems 2000 discussed below with regard to FIG. 12. Analysis job worker 710 may implement job manager 720 get and update analysis jobs, as discussed above with regard to FIG. 6. Job manager 720 may also identify and obtain log records 702 from which to perform a transaction analysis job.

Job manager 720 may provide the retrieved log records 702 to graph generation 730 which may apply the graph generation techniques discussed below with regard to FIG. 9 to generate a graph representation that indicates the dependencies between transactions under analysis. Although not illustrated, graph generation 730 may perform some error or other validation checking (e.g., for singleton writes that appear after prepare log record for a transaction but before a commit for the transaction) or other errors that may be detected based on the log alone. For those errors detected, graph generation 730 may return error indications to job manager 720 which may report them as part of job status (not illustrated).

Figure 8:
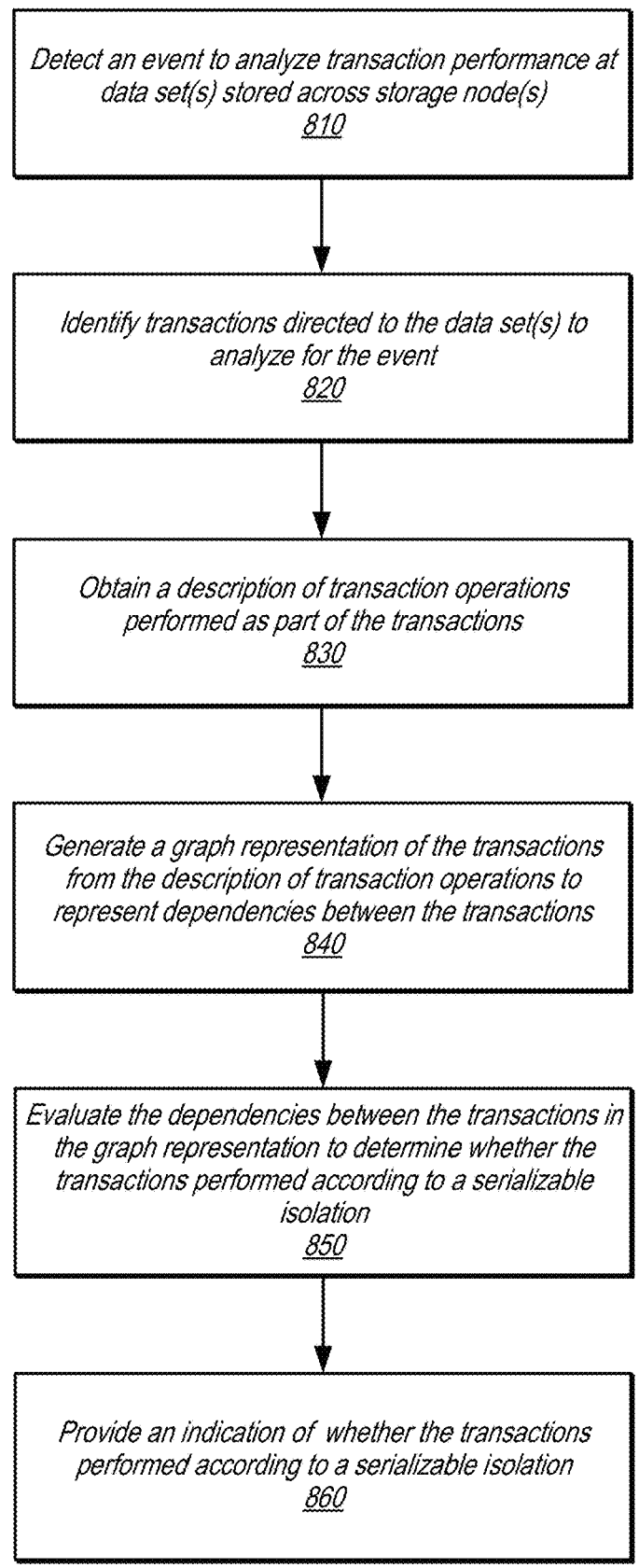
FIG. 8 is a high-level flowchart illustrating various methods and techniques to implement graphing transaction operations for transaction compliance analysis, according to some embodiments.

Graph generation 730 may provide graph representations for serializable isolation analysis 740 and atomicity analysis 750, in serializable analysis 740 may evaluate the graph for cycles using graph search or traversal techniques in order to identify non-serialized transactions, as discussed below with regard to FIG. 8. Atomicity analysis 750 may evaluate information included with or identified for nodes in the graph, as discussed below with regard to FIG. 11, to determine whether a transaction was atomically performed. For example, atomicity analysis 750 may request a transaction checksum 742, in order to compare the received transaction checksum with a transaction checksum generated from the item values identified by a node in the graph. The requests 742 and response 744 may be made to the transaction ledger 242 in some embodiments. In some embodiments, atomicity analysis 750 may be performed without utilizing a graph generated at 730. Instead, in such an embodiment atomicity 750 analysis may scan or evaluate the log records 702 provided to job manager 720 directly to identify those log records associated with a transaction to be evaluated and perform the checksum analysis discussed below.

The analysis results 740 may, in some embodiments, be provided to root cause analysis 760. Root cause analysis 760 may evaluate identified failures to determine features such as which component (e.g., storage node, transaction coordinator, control plane) or resource (e.g., network failure) caused the failure. Log records and/or other metadata, including information from transaction ledger 224, may be accessed and evaluated to make the root cause determination. For example, sequence numbers, timestamps, or other values for the operations associated with a non-compliant transaction may be evaluated to see if a storage node performed an operation in violation of their instructions or internal state for the item (e.g., did the storage node perform the operation with only a prepare instruction for the operation as discussed above in FIG. 4). Analysis indications 704, including failure indications may be provided (as part of a job status update or a direct response to a client, or to a result store). Root cause analysis 760 may include further information determined as part of root cause analysis 760 (if any), in some embodiments.

The examples of a database service that implements graphing transaction operations for transaction compliance analysis as discussed in FIGS. 2-7 above have been given in regard to a database service (e.g., a non-relational or NoSQL database service or a relational database service). However, various other types of data access, management, or control systems or data processing systems may implement transactions across a distributed data set or data sets and thus may implement graphing transaction operations for transaction compliance analysis, in other embodiments. FIG. 8 is a high-level flowchart illustrating various methods and techniques to implement graphing transaction operations for transaction compliance analysis, according to some embodiments. These techniques, as well as the techniques discussed with regard to FIGS. 9-11, may be implemented using components or systems as described above with regard to FIGS. 2-7, as well as other types of databases, storage engines, or systems, and thus the following discussion is not intended to be limiting as to the other types of systems that may implement the described techniques.

As indicated at 810, an event to analyze transaction performance at data set(s) stored across storage node(s) may be detected, in some embodiments. Monitoring or sampling techniques may be implemented that trigger events to check transaction performance across the data set(s) periodically or according to a percentage of transactions performed (e.g., 10% of all transactions). In some embodiments, transaction performance may be identified for particular client application, database login identifier, or user account (e.g., when data stores store data sets for multiple different clients or users, such as the database and storage services discussed above with regard to FIG. 2). In some embodiments, the event may be detected in response to a request received via an interface, such as an API, command line, GUI, or other interface to a system that implements the techniques of FIG. 8.

The detected event may include information about the transactions to analyze and/or the data sets to perform. For example, the event may be monitoring for transactions across a range of client applications or user accounts, and thus the event may specify which user accounts and data sets are to be analyzed. The detected event may specify what analysis are to be performed, such as the serializability analysis discussed below and/or other analysis such as the atomicity analysis discussed with regard to FIG. 11.

As indicated at 820, transactions directed to the data set(s) may be identified to analyze for the event, in some embodiments. For example, a time period, as discussed below, may be determined for the transactions, from a request for analysis or from a pre-defined size (which may be defined to capture a percentage of transactions performed at a data store). In some embodiments, the transactions may be identified out of a larger set of transactions that are described together (e.g., in a single log for a multitenant storage node that stores different database partitions for different database tables).

As indicated at 830, a description of transaction operations performed as part of the transactions may be obtained, in some embodiments. For example, as discussed above (and below), a log transaction operations may be accessed, with log records that describe the transaction operations (and their associated transactions). In some embodiments, other data set or data store operations may be described, such as writes, updates, or other changes to a data set (e.g., partitioning, schema changes, etc.), which may also be considered when analyzing transaction performance.

As indicated at 840, a graph representation of the transactions may be generated from the description of transaction operations to represent dependencies between the transactions, in some embodiments. For example, as discussed in detail below with regard to FIG. 9, the times at which a same item is written in different transactions may be used to generate a graph that indicates which transaction is dependent upon the performance of another transaction. As indicated at 850, the dependencies between the transactions in the graph representation to determine whether the transactions are performed according to a serializable isolation may be evaluated, in some embodiments. For example, a search or evaluation of the edges between nodes in the graph representation to determine whether a cycle exists would indicate if transactions failed to achieve serializable isolation—as cyclical dependencies could indicate that a first transaction that was dependent on a second transaction that was also a transaction from which the second transaction was dependent on (e.g., directly, or indirectly as illustrated below in FIG. 10, where transaction 3 is dependent on transaction 1 with transaction 2 dependent on transaction 3). Various techniques for identifying cycles in the graph representation may be implemented, such as a depth first search (DFS), among others.

As indicated at 860, an indication of whether the transactions are performed according to serializable isolation may be provided, in some embodiments. For example, if the analysis event is part of a monitoring feature, then the response may indicate no detected failure, whereas if the analysis event is triggered by a client request, then the indication may describe information about the analysis (e.g., success) and its subject (e.g., range or period of time, client applications that submitted transactions, etc.). In some embodiments, failure indications may identify specific transactions that failed, the client applications or other source of the transactions and/or other information for further failure analysis or investigation. The indication may be provided back via the interface through which the event was triggered or detected or may be stored to a log or other performance store that is monitored for failures or other results. The techniques described above with regard to FIG. 8 may be repeatedly applied as part of a monitoring feature, in some embodiments.

Figure 9:
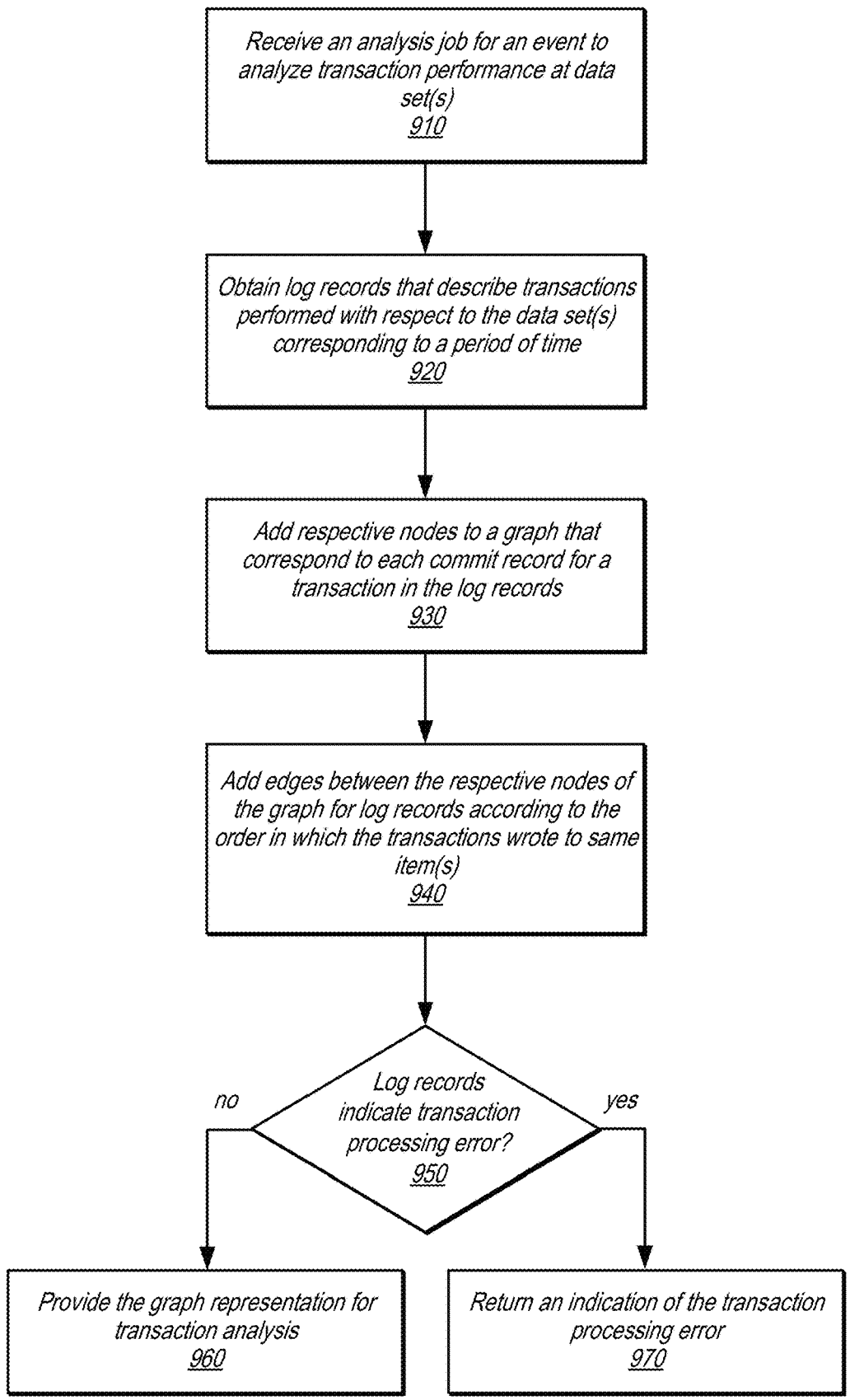
FIG. 9 is a high-level flowchart illustrating various methods and techniques to generate a graph for transaction compliance analysis, according to some embodiments.

FIG. 9 is a high-level flowchart illustrating various methods and techniques to generate a graph for transaction compliance analysis, according to some embodiments. As indicated at 910, an analysis job for an event to analyze transaction performance at data set(s) may be received, in some embodiments. For example, as discussed above with regard to FIG. 6, a control plane or other system component may create and place jobs in a queue or dispatch them to an analysis node (or other computing resource) that may perform some or all of the transaction analysis, including the generation of a graph for analysis. The analysis job may specify the features of the transaction(s) to analysis, such as a time period of transactions performed by a client application or group of client applications associated with a particular account, in some embodiments. The analysis job may also specify the features of the job, such as the type of analyses to be performed, which may inform the information to include in or associate with nodes of the graph.

As indicated at 920, log records that describe transactions performed with respect to the data set(s) corresponding to a period of time may be obtained, in some embodiments. For example, a log sequence number or time stamp associated with the boundaries of the time period may be determined (e.g., time period start time corresponds to log sequence number (LSN) 123 and time period end time corresponds to LSN 456). A data store for the log records may be accessed via a programmatic interface (e.g., an Application Programming Interface (API)) to request, read, or otherwise retrieve log records for the time period. In some embodiments, the data store for log records may be a ledger, such as replication log 540, discussed above with regard to FIG. 6, which could be log records maintained in the data store of the data set(s) themselves (e.g., at the storage nodes that store the data sets) as the log records may be replication log records may be used for replicating changes amongst a group of storage nodes that maintain the data set according to a data mirroring or sharding scheme, or a separate log store (e.g., such as may be implemented as part of transaction ledger 224).

In some embodiments, data set(s) involved in transactions may be partitioned or distributed. In such scenarios, separately maintained logs (or portions of a single log for the different partitions or distributions) may be separately scanned, queries, or otherwise accessed in order to obtain the log records that fall within the time period. As some data set(s) may be stored in data stores that dynamically adjust in size or distribution, metadata (or the log itself) that describes the changes in a partition's lineage (e.g., partition A is split at some point to become partition AA and AB) may be evaluated to determine if additional partitions or log records that may have not existed at the beginning of the time period under analysis should be considered when obtaining log records. As discussed below with regard to FIG. 10, in at least some embodiments, additional log records that buffer the time period before and after the end of the time period may be included for consideration in generating the graph.

As indicated at 930, respective nodes may be added to a graph that correspond to each commit record for a transaction ion the log records, in some embodiments. For instance, according to the transaction protocol discussed above with regard to FIG. 4, requests to commit an item transaction may be sent in the second phase 404. These commit requests may be recorded or described in a commit log record in some embodiments. Thus, for each commit log record found in the log records of the time period that were obtained a graph node that represents that transaction may be created, in some embodiments. In at least some embodiments, a check may be made when a commit log record is found to identify a prepare log record that is in the log before the commit log record (e.g., by searching for a prepare log record with the same transaction identifier and earlier LSN). The graph may be maintained in various types of data structures, such as an edge list structure or adjacency matrix, among others. Thus, to add the respective nodes, the data structure may be updated to include the nodes.

As indicated at 940, edges may be added between the respective nodes of the graph for log records according to the order in which the transactions wrote to same items, in some embodiments. For example, time stamp values, LSNs, or other ordering indications for log records that indicate a write to an item in a data set may be compared. The items may be identified by a key value or other identifier, in some embodiments. Directed edges may be stored in order to indicate the dependency of writes to the item between the transactions, in some embodiments. In some embodiments, the information about the write or record may be stored, such as an item identifier (e.g., key value) and value as a result of the write.

As indicated at 950, other error checks or validations may be performed when generating the graph, in some embodiments. For example, the log record may include records that describe operations that were not included in a transaction (sometimes referred to as singleton operations). If, for instance, a singleton write operation were to be recorded after a prepare log record for a transaction but before a commit log record of the transaction, then an error may be identified (as the write was performed during a transaction). Another example of an error that could be checked for may be reviewing the obtained log records to see if a prepare log record comes after a previous prepare log record but before the commit log record of the transaction of the previously prepare log record (e.g., prepare for transaction A→prepare for transaction B→commit for transaction A, would trigger detection of an error).

As indicated at 960, if no errors are found, the graph representation may be provided for transaction analysis, in some embodiments. For example, a pointer, handle, address, or other locator of the graph representation may be submitted to another function or component that performs transaction analysis, or a copy of the graph representation may be sent to another node for analysis. If, however, a performance error is detected, then an indication of the transaction processing error may be provided, as indicated at 970. For example, an error code, error identifier, and other information associated with the error (e.g., the transaction or other operation that caused the error, the storage nodes involved with the error, the client application that submitted the transaction or other operation, timestamp or LSN of the log records, and/or other related information) may be provided, in some embodiments. In some embodiments, detection of a processing error may end further transaction analysis so that resources to perform additional analysis are not consumed (saving resources for other analysis or operations). In other embodiments, however, transaction performance analysis continue (even though the graph or log records from which it was generated may contain errors).

Figure 10:
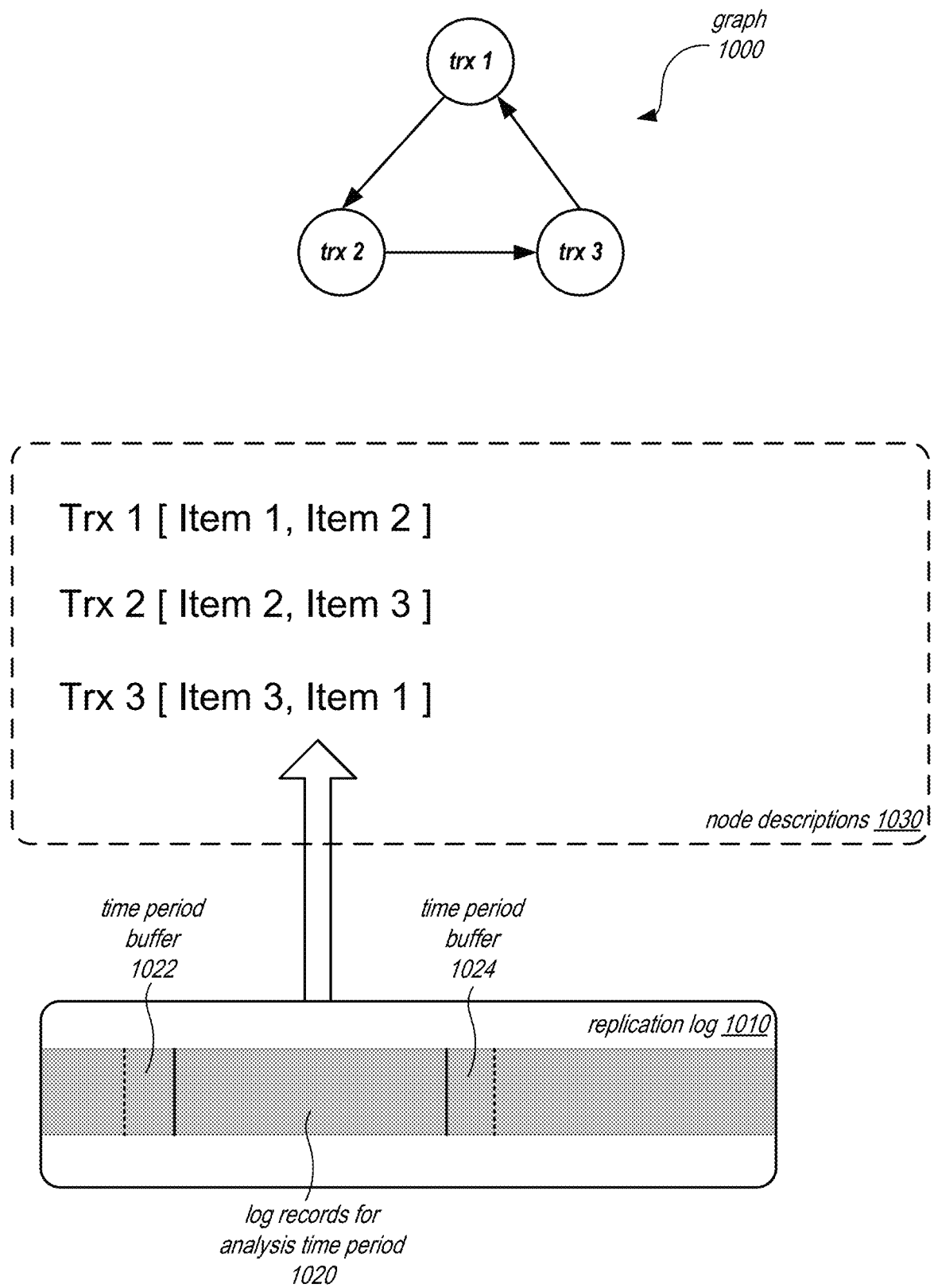
FIG. 10 is an example graph generated from a description of transaction operations from transaction ledger maintained as a log, according to some embodiments.

FIG. 10 is an example graph generated from a description of transaction operations from transaction ledger maintained as a log, according to some embodiments. Graph 1000 illustrates an example graph that can be generated from log records. Replication log 1010 may be maintained at storage node(s) that store the data of data set, a separate archive store for log records, or as part of other transaction metadata storage (e.g., transaction ledger 224). Time period 1020 (which may be represented by timestamps or LSNs) may indicate the time period for which analysis is requested. Time period buffer 1022 and time period buffer 1024 may represent the time periods for which log records may be needed to generate the graph or check for errors, as discussed above with regard to FIG. 9. For example, if a prepare record in time period 1020 for a transaction is received, but a commit record is not received, then the log records of time period buffer 1024 may be searched for a commit record that corresponds to that prepare record. In another example, a commit record within time period 1020 may have a log record that indicates the prepare phase (e.g., a prepare record) in a time period prior to time period 1020, and thus time period buffer 1022 may be searched for that log record. The amount of time period buffers 1022 and 1024 may correspond to a transaction performance time (e.g., time period buffer 1022 may be as long as the longest transaction performance time, likewise time period buffer 1024 may be as long as the longest transaction time). Transaction time length may be tracked so as to dynamically determine the time period buffer, in some embodiments. Alternatively, transactions may timeout and abort after a certain length of time so that the time period buffers may correspond to the time out length of time.

Node descriptions 1030 may be read or determined from replication log 1010 (e.g., from log records for time period 1020 and buffer time periods 1022 and 1024). For example, transaction 1 may include a listing of items 1 and 2 (and could include timestamps indicating their update at a time, transaction 2 may include a listing of items 2 and 3, and transaction 3 may include a listing of items 3 and 1.

Graph 1000 can be created from node descriptions 1030 according to the techniques discussed above with regard to FIG. 9. For example, an edge between transaction 1 and transaction 2 may be created because transaction 2 wrote to item 3 before transaction 1 (e.g., according to an update timestamp comparison for the items and transactions). An edge between transaction 3 and transaction 1 may be created because transaction 3 wrote to item 1 after transaction 1. Another edge may be created between transaction 2 and transaction 3 because transaction 2 wrote to item 1 after transaction 3. Please note that the edges illustrated in FIG. 10 are provided for illustrative purposes. Multiple edges between nodes could exist, in some embodiments.

As discussed above with regard to FIG. 8, graph 1000 could be evaluated to identify whether serializable isolation was provided. For example, because the dependency relationships are indicated by the directed edges of the nodes of graph 1000, a cycle in the graph would indicate that two transactions are not serializable, such as the cycle between transactions 1, 2, and 3 (e.g., as transactions 1 and 2 are not serializable).

Figure 11:
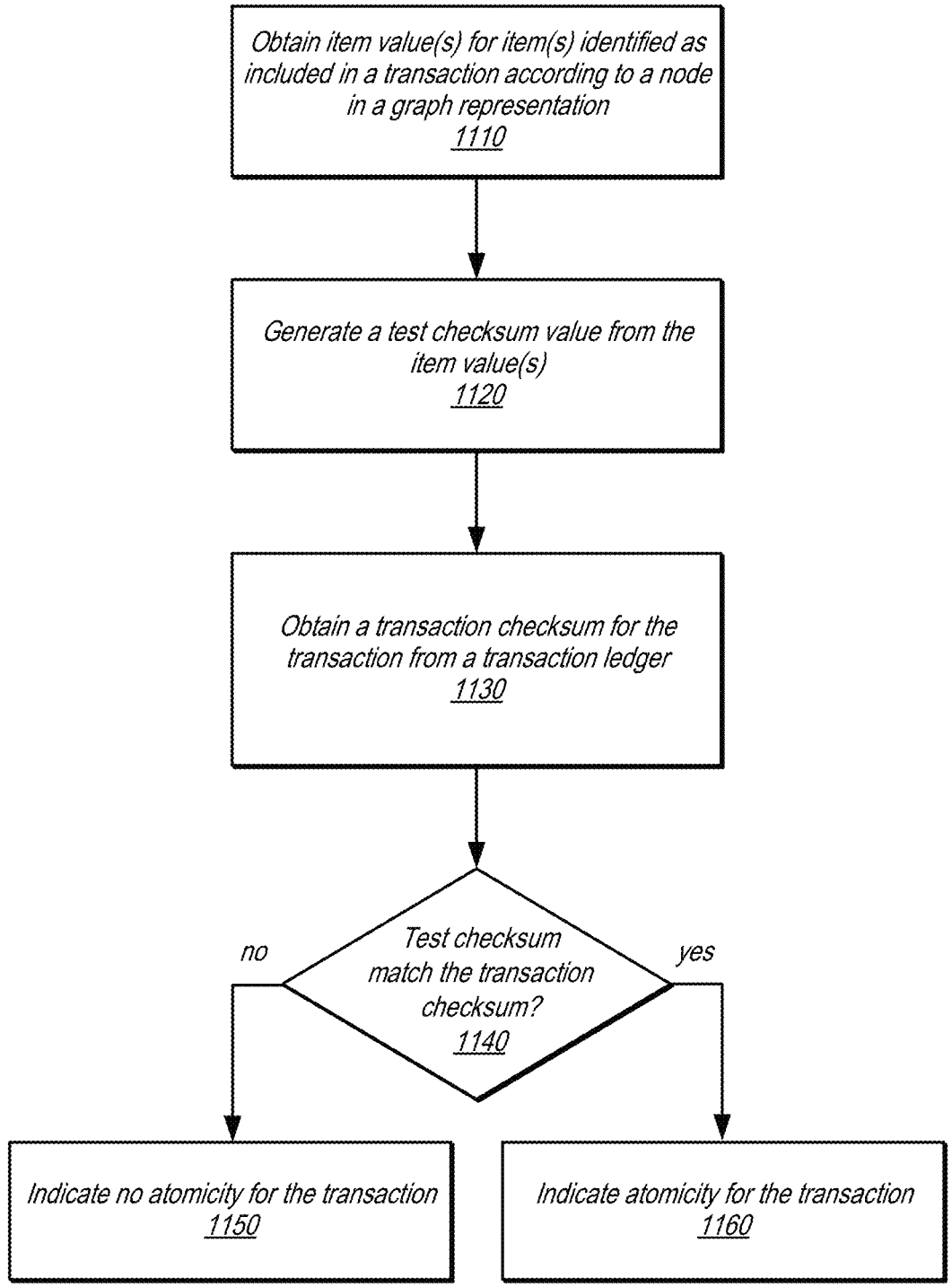
FIG. 11 is a high-level flowchart illustrating various methods and techniques to analyze atomicity compliance for transactions, according to some embodiments.

The information associated with, collected, or included with the graph of transaction operations as discussed above with regard to FIGS. 8-10, may be used to perform other analytical techniques with regard to transactions. Atomicity, for instance, is property of transactions, as discussed above with regard to FIGS. 1 and 7, which may be validated using graphs that represent dependencies between transactions. FIG. 11 is a high-level flowchart illustrating various methods and techniques to analyze atomicity compliance for transactions, according to some embodiments.

Atomicity analysis may be performed in parallel or after other analysis for transaction properties, such as serializable isolation. The ordering of analyses may be performed so that if one transaction property fails, then another transaction property may be performed. For example, atomicity analysis may be performed, in some embodiments, only if serializable isolation analyses fails. Alternatively, atomicity analysis (or other analysis) may be performed independent of the failure or success (or other result) of other transaction feature analysis.

Atomicity analysis may be identified or indicated as part of a job, request, or other event that initiations performance of atomicity analysis for an identified transaction. As indicated at 1110, item value(s) for item(s) identified as included in a transaction according to a node in a graph representation may be obtained. For example, the node that represents a transaction may store item values for the transaction as part of the node data (e.g., in a database, data object, or other structure that backs the graph). Consider transaction 1 (Trx 1) in FIG. 10. A node in graph 1000 for trx1 may store the values of "Item 1" at time $T_1$, "Item 3" at time $T_4$, and "Item 4" at time $T_6$. These values may be read, requested, or otherwise obtained from the node data. In some embodiments, the log records or other description information for transactions may be scanned, searched or evaluated for the atomicity analysis to obtain the item value(s) for the item(s) without generating a graph.

As indicated at 1120, a test checksum value may be generated from the item value(s), in some embodiments. A checksum function may, for instance, be applied to the item value(s) (or portions thereof). Different types of checksum functions may be applied, such as those that utilize a parity byte or word, modular sums, or position dependent checksums (e.g., Fletcher's checksum, Adler-32, and cyclic redundancy checks (CRCs)), among others.

In some embodiments, a transaction checksum may be generated based on the item values at the time the transaction is performed. This transaction checksum value may be stored as part of the state ledger (e.g., as a log record). As indicated 1130, a transaction checksum for the transaction from a transaction ledger, in some embodiments. A read, search, query, or other type of request may be made to or upon the state ledger in order to retrieve the transaction checksum value, for instance. In another embodiment, a transaction checksum may be generated based on the item values at the time the transaction is performed. This transaction checksum can be stored as part of each prepare, commit, abort log entry so that no lookup is ever required on state ledger and dependency on state ledger is removed completely for verification, in some embodiments. The test checksum may still be computed as mentioned above at 1120.

As indicated at 1140, an evaluation of whether the test checksum matches the transaction checksum may be performed. If the checksum values do not match, then as indicated at 1150, an indication of no atomicity may be provided for the transaction. However, if the checksum values do match, then as indicated at 1160, an indication of atomicity for the transaction may be provided.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 12:
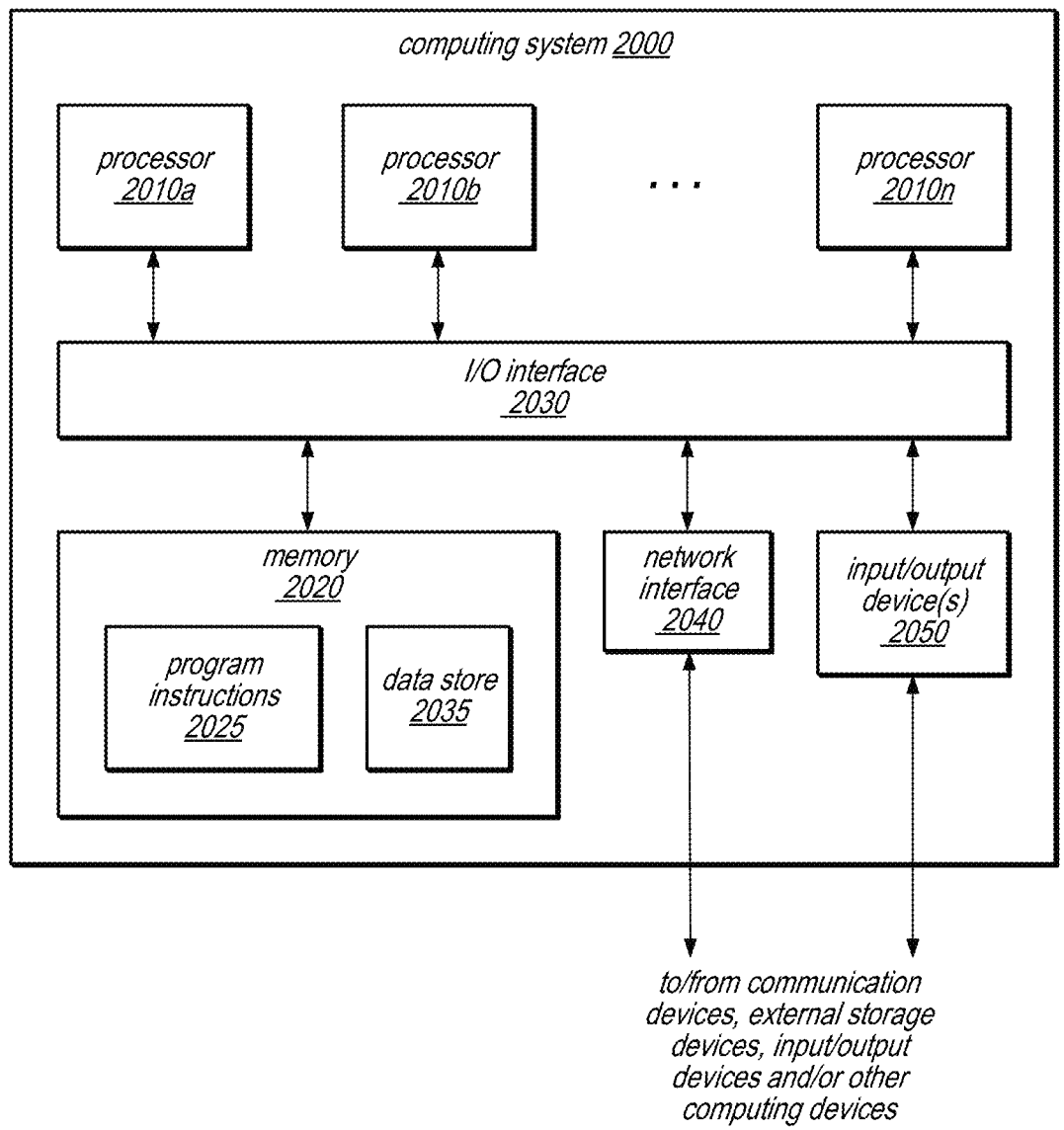
FIG. 12 is a block diagram illustrating an example computing system, according to some embodiments.

Embodiments to implement ordering transaction requests in a distributed database according to an independently assigned sequence as described herein may be executed on one or more computer systems, which may interact with various other devices. One such computer system is illustrated by FIG. 12. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions, in one embodiment. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 2020 may store program instructions 2025 and/or data accessible by processor 2010, in one embodiment. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. A computer-accessible medium may include non-transitory storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040, in one embodiment.

In one embodiment, I/O interface 2030 may be coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000, in one embodiment. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000, in one embodiment. Multiple input/output devices 2050 may be present in computer system 2000 or may be distributed on various nodes of computer system 2000, in one embodiment. In some embodiments, similar input/output devices may be separate from computer system 2000 and may interact with one or more nodes of computer system 2000 through a wired or wireless connection, such as over network interface 2040.

As shown in FIG. 12, memory 2020 may include program instructions 2025, that implement the various embodiments of the systems as described herein, and data store 2035, comprising various data accessible by program instructions 2025, in one embodiment. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 2000 may be transmitted to computer system 2000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more storage nodes, respectively comprising at least one processor and a memory, wherein the one or more storage nodes together implement a data store that stores a data set;
a control plane for the data store separate from the plurality of storage nodes, respectively comprising at least one other processor and at least one other memory, wherein the control plane is configured to:
create a job to analyze transaction performance with respect to the data set;
identify a plurality of transactions directed to the data set to analyze for the job;
obtain log records that describe transaction operations performed as part of the plurality of transactions;
generate a graph representation of the plurality of transactions from the log records to represent dependencies between the plurality transactions;
evaluate the dependencies between the plurality of transactions in the graph representation to determine that the plurality of transactions failed to be performed according to a serializable isolation level; and
provide a result for the job that includes an indication of the failure of the plurality of transactions to be performed according to the serializable isolation level.

2. The system of claim 1, wherein the control plane is further configured to:
create a second job to analyze transaction performance with respect to the data set;
identify a second plurality of transactions directed to the data set to analyze for the second job;
obtain log records that describe transaction operations performed as part of the second plurality of transactions;
generate a second graph representation of the second plurality of transactions from the log records that describe transaction operations performed as part of the second plurality of transactions to represent dependencies between the second plurality transactions;
obtain one or more item values for one or more items identified as included in a node in the second graph representation for one transaction of the second plurality of transactions;
generate a test checksum value from the one or more item values;
compare the test checksum value with a transaction checksum value recorded from a transaction ledger by a transaction coordinator for the one transaction to determine that the transaction checksum value does not match the test checksum value; and
provide an indication that the one transaction was not atomically performed according to the determination that the transaction checksum value does not match the test checksum value.

3. The system of claim 1, wherein to generate the graph representation of the plurality of transactions from the log records to represent dependencies between the plurality transactions, the control plane is configured to:
add respective nodes to the graph representation that correspond to commit records for each of the plurality of transactions found in the log records; and
add edges between the respective nodes according to an order in which the plurality of transactions write to same items in the data set.

4. The system of claim 1, wherein the data store is a non-relational database service, wherein the data set is a table stored in different partitions at different ones of the one or more storage nodes, and wherein the job is created responsive to a request received via an interface for the control plane to perform the analysis of the plurality of transactions.

5. A method, comprising:
detecting an event to analyze transaction performance with respect to one or more data sets stored across one or more storage nodes;
identifying a plurality of transactions directed to the one or more data sets to analyze for the event;
obtaining a description of transaction operations performed as part of the plurality of transactions;
generating a graph representation of the plurality of transactions from the description of transaction operations to represent dependencies between the plurality transactions;
evaluating the dependencies between the plurality of transactions in the graph representation to determine that the plurality of transactions failed to be performed according to a serializable isolation level; and
providing an indication of the failure to be performed according to the serializable isolation level responsive to the event.

6. The method of claim 5, further comprising:
detecting a second event to analyze transaction performance with respect to the one or more data sets stored across the one or more storage nodes;
identifying a second plurality of transactions directed to the one or more data sets to analyze for the second event;
obtaining a description of transaction operations performed as part of the second plurality of transactions;
obtaining one or more item values for one or more items identified as included in one transaction in the second plurality of transactions;
generating a test checksum value from the one or more item values;
comparing the test checksum value with a transaction checksum value recorded from a transaction ledger by a transaction coordinator for the one transaction to determine that the transaction checksum value does not match the test checksum value; and
providing an indication that the one transaction was not atomically performed according to the determination that the transaction checksum value does not match the test checksum value.

7. The method of claim 5, wherein the event is detected by a control plane that monitors performance transactions to the one or more data sets at the one or more storage nodes and wherein the one or more storage nodes are implemented as part of a larger number of storage nodes that store a plurality of data sets including the one or more data sets on behalf of a plurality of clients.

8. The method of claim 5, wherein identifying the plurality of transactions directed to the one or more data sets to analyze for the event comprises evaluating log records within a time period that correspond to a log for the one or more data sets and buffer time periods before and after the time period.

9. The method of claim 5, wherein generating the graph representation of the plurality of transactions from the description of transaction operations to represent dependencies between the plurality transactions comprises:
  adding respective nodes to the graph representation that correspond to commit records for each of the plurality of transactions found in the description; and
  adding edges between the respective nodes of the graph according to an order in which the plurality of transactions write to same items in the data set.

10. The method of claim 9, wherein adding respective nodes to the graph representation that correspond to commit records for each of the plurality of transactions found in the description comprises confirming that prepare records corresponding to the commit records were found for each of the plurality of transactions before the commit records.

11. The method of claim 9, wherein evaluating the dependencies between the plurality of transactions in the graph representation to determine that the plurality of transactions failed to be performed according to a serializable isolation level comprises searching the graph for a cycle between the respective nodes according to the edges.

12. The method of claim 5, wherein generating the graph representation of the plurality of transactions from the description of transaction operations to represent dependencies between the plurality transactions comprises determining that a write operation to the data set not included in a transaction did not occur between a prepare and a commit for any of the plurality of transactions.

13. The method of claim 5, wherein a first one of the one or more storage nodes is implemented at a first service of a provider network, wherein a second one of the one or more storage nodes is implemented at a second service of the provider network, and wherein the plurality of transactions are performed at one of the first and second storage nodes or both of the first and second storage nodes.

14. One or more non-transitory, computer-readable storage media, storing program instructions that when executed on or across one or more computing devices cause the one or more computing devices to implement:
  receiving a request to analyze transaction performance with respect to one or more data sets stored across one or more storage nodes;
  identifying a plurality of transactions directed to the one or more data sets to analyze for the event;
  obtaining a description of transaction operations performed as part of the plurality of transactions;
  generating a graph representation of the plurality of transactions from the description of transaction operations to represent dependencies between the plurality transactions;
  evaluating the dependencies between the plurality of transactions in the graph representation to determine that the plurality of transactions failed to be performed according to a serializable isolation level; and
  providing an indication of the failure to be performed according to the serializable isolation level responsive to the request.

15. The one or more non-transitory, computer-readable storage media of claim 14, wherein the program instructions when executed by the one or more computing devices cause the one or more computing devices to further implement:
  receiving a second request to analyze transaction performance at the one or more data sets stored across the one or more storage nodes;
  identifying a second plurality of transactions directed to the one or more data sets to analyze for the second event;
  obtaining a description of transaction operations performed as part of the second plurality of transactions;
  generating a second graph representation of the second plurality of transactions from the description of transaction operations to represent dependencies between the plurality transactions;
  obtaining one or more item values for one or more items identified as included in a node in the second graph representation for one transaction of the second plurality of transactions;
  generating a test checksum value from the one or more item values;
  comparing the test checksum value with a transaction checksum value recorded from a transaction ledger by a transaction coordinator for the one transaction to determine that the transaction checksum value does not match the test checksum value; and
  providing an indication that the one transaction was not atomically performed according to the determination that the transaction checksum value does not match the test checksum value responsive to the second request.

16. The one or more non-transitory, computer-readable storage media of claim 14, wherein, in generating the graph representation of the plurality of transactions from the description of transaction operations to represent dependencies between the plurality transactions, the program instructions when executed by the one or more computing devices cause the one or more computing devices to implement:
  adding respective nodes to the graph representation that correspond to commit records for each of the plurality of transactions found in the description; and
  adding edges between the respective nodes of the graph according to an order in which the plurality of transactions write to same items in the data set.

17. The one or more non-transitory, computer-readable storage media of claim 16, wherein, in evaluating the dependencies between the plurality of transactions in the graph representation to determine that the plurality of transactions failed to be performed according to a serializable isolation level, the program instructions when executed by the one or more computing devices cause the one or more computing devices to implement applying a depth first search technique to search the graph for a cycle between the respective nodes according to the edges.

18. The one or more non-transitory, computer-readable storage media of claim 14, wherein, in generating the graph representation of the plurality of transactions from the description of transaction operations to represent dependencies between the plurality transactions, the program instructions when executed by the one or more computing devices cause the one or more computing devices to implement determining that a second prepare for a second transaction did not occur between a first prepare and a first commit for a first one of the plurality of transactions.

19. The one or more non-transitory, computer-readable storage media of claim 14, wherein the request is received via an interface for a control plane for the one or more storage nodes and wherein the plurality of transactions are identified according to a time period for the analysis identified in the request.

20. The one or more non-transitory, computer-readable storage media of claim 14, wherein the one or more storage nodes are implemented as part as part of a NoSQL database that store different partitions of a table at the one or more storage nodes.

* * * * *